United States Patent [19]

Apostolos

[11] Patent Number: 5,079,735
[45] Date of Patent: Jan. 7, 1992

[54] HIGH-DYNAMIC-RANGE COMPRESSIVE RECEIVER

[75] Inventor: John T. Apostolos, Merrimack, N.H.

[73] Assignee: Sanders Associates, Inc., Nashua, N.H.

[21] Appl. No.: 482,312

[22] Filed: Feb. 20, 1990

[51] Int. Cl.⁵ .................. G06G 7/19; H04B 17/00; G01S 13/00
[52] U.S. Cl. .................. 364/827; 324/77 B; 455/226; 342/192
[58] Field of Search .............. 364/827, 485; 333/141, 333/144, 145, 138; 455/145, 147, 148, 226, 314–316; 324/77 B, 77 C, 77 CS, 77 H; 342/192

[56] References Cited
U.S. PATENT DOCUMENTS

| 3,729,738 | 4/1973 | Cross et al. ................ 324/77.6 |
| 3,898,591 | 8/1975 | Mortley et al. . |
| 3,939,411 | 2/1976 | James .................. 324/77 H |
| 3,955,137 | 5/1976 | Harrington et al. ............ 324/77 B |
| 4,131,852 | 12/1978 | Holland-Moritz .............. 324/77 B |
| 4,200,840 | 4/1980 | Tsui ................... 324/77 B |
| 4,206,316 | 6/1980 | Burnsweig et al. . |
| 4,207,209 | 5/1981 | Albanese . |
| 4,247,939 | 1/1981 | Stromswold et al. . |
| 4,305,159 | 12/1981 | Stromswold et al. . |
| 4,404,562 | 9/1983 | Kretschmer et al. . |
| 4,562,438 | 12/1985 | Rouse et al. . |
| 4,704,737 | 11/1987 | Estrick et al. ............. 455/226 |
| 4,733,237 | 3/1988 | Apostolos et al. .............. 455/226 |

Primary Examiner—Jerry Smith
Assistant Examiner—Jim Trammell
Attorney, Agent, or Firm—Cesari & McKenna

[57] ABSTRACT

A compressive receiver (10) includes a modulation circuit (14) that modulates the receiver input signal with compensation values equal to the ratio of the transfer function of an ideal linear dispersive delay line to that of the main compressive-receiver linear dispersive delay line (22). An auxiliary linear dispersive delay line (16) dispersively delays the results modulated signal at the reciprocal of the compressive receiver's chirp rate, and the resultant signal is progressively translated in frequency by a frequency translator (18) at the compressive-receiver chirp rate. As a consequence, each point in a signal-frequency component of the input signal is translated to the frequency at which the compensation function was evaluated in modulating the component at that point in time, so the departure of the main dispersive delay line (22) from linearity is compensated for, and increased dynamic range results.

6 Claims, 2 Drawing Sheets

HIGH-DYNAMIC-RANGE COMPRESSIVE RECEIVER

BACKGROUND OF THE INVENTION

The present invention is directed to compressive receivers. It finds particular, although not exclusive, application to compressive receivers that employ surface-acoustic-wave (SAW) dispersive delay lines.

Compressive receivers are powerful signal-processing devices. In a compressive receiver, an incoming signal is progressively translated in frequency, and the resultant "chirped" signal is applied to a linear dispersive delay line, i.e., to a delay line whose delay as a function of frequency is linear. The portionality of delay to frequency is the reciprocal of the chirp rate of the frequency translation. As a consequence, the compressive-receiver output is essentially a Fourier transform of the input signal.

Specifically, the output of the linear dispersive delay line takes the form of a highly modulated sinusoidal signal whose frequency is the center frequency of the delay-line input port. The amplitude of the output sinusoidal signal at a given time is indicative of the amplitude of the spectral content of the receiver input signal at a frequency corresponding to that time, and the phase of the output sinusoid is indicative of the phase of that spectral component.

The Fourier transform of an unmodulated single-frequency signal of infinite duration is an impulse in frequency, i.e., a function of infinite height, of infinitesimal width in frequency, and thus of maximum frequency resolution. The response of a compressive receiver to such a signal, however, has a finite width in frequency, because the duration of the signal that the delay line receives in response to a single-frequency input component is finite. The progressive frequency translation occurs repeatedly over successive input-signal records of only finite lengths. Of the chirp-signal component that results from the progressive translation of a single-frequency component in that finite-length record, moreover, only a segment falls within the pass band of the delay line's input filter.

This necessarily finite input length has an effect not only on frequency resolution but also on dynamic range. The Fourier transform of a single frequency $f_o$ modulated by a rectangular (finite-duration) pulse of width T is a Fourier transform of the form $[\sin(f-f_o)T]/[(f-f_o)T]$. That is, the transform is a function having a maximum in a central lobe at $f_o$ whose width is inversely proportional to record duration. The central lobe is bracketed by minima beyond which local maxima of decreasing amplitude occur in "sidelobes." These sidelobes tend to limit the dynamic range of the compressive receiver; transforms of smaller signals whose magnitudes fall below that of the largest sidelobe of the highest-magnitude signal must be ignored since they cannot be distinguished from sidelobes.

One approach to reducing the adverse effects of sidelobes is to filter the input of the dispersive delay line with a Gaussian filter, which imposes a Gaussian, instead of a rectangular, envelope on the chirp signal that results from a narrow-band input. The result, if all other components of the receiver were ideal, would be a Gaussian output envelope, i.e., one that diminishes monotonically on both sides of the maximum and thus does not produce the sidelobes that result from abrupt interruptions of the input record.

Unfortunately, the other components are not ideal, and certain of their inaccuracies manifest themselves as sidelobes, which reduce the dynamic range from that of an ideal Gaussian-envelope system. The most important of these inaccuracies is the departure of the linear dispersive delay line from precise linearity.

This dynamic-range reduction is particularly pronounced in an intermediate range of frequencies between 30 MHz and 1 GHz. In the region below about 30 MHz, the dispersive delay line is typically embodied in a bulk acoustic delay line, which can be made highly linear; dynamic ranges in excess of 60 db are routinely achieved in compressive receivers that employ such delay lines. In the microwave region above approximately 1 GHz, surface-electromagnetic-wave delay lines can be used that result in similar dynamic ranges.

However, in the intermediate range between approximately 30 MHz and 1 GHz, it is necessary to resort to surface-acoustic-wave dispersive delay lines, and it has not typically been feasible to make such delay lines linear enough to achieve dynamic ranges much in excess of 30 db.

SUMMARY OF THE INVENTION

The present invention is a compressive receiver that can greatly extend the dynamic range of such devices without improving the linearity commonly available from surface-acoustic-wave delay lines. According to the present invention, the compressive receiver's frequency translator is preceded by a modulator and an auxiliary linear dispersive delay line. The modulator repeatedly modulates the input signal with a compensation function. The compensation function is the ratio of (1) the transfer function of an ideal linear dispersive delay line to (2) the actual transfer function of the main dispersive delay line, and the value of frequency at which the modulator evaluates the compensation function changes with time at the chirp rate of the frequency translator. The auxiliary linear dispersive delay line dispersively delays the different frequency components of the input signal in such a manner that the frequency translator translates every point in a given input-signal frequency component to the frequency at which the modulator evaluated the compensation function to modulate that point in the component. The result is largely to compensate for the departure of the main dispersive delay line from linearity.

BRIEF DESCRIPTION OF THE DRAWING

These and further features and advantages of the present invention are described below in connection with the accompanying drawings, in which.

DETAILED DESCRIPTION OF AN ILLUSTRATIVE EMBODIMENT

Figure 1:
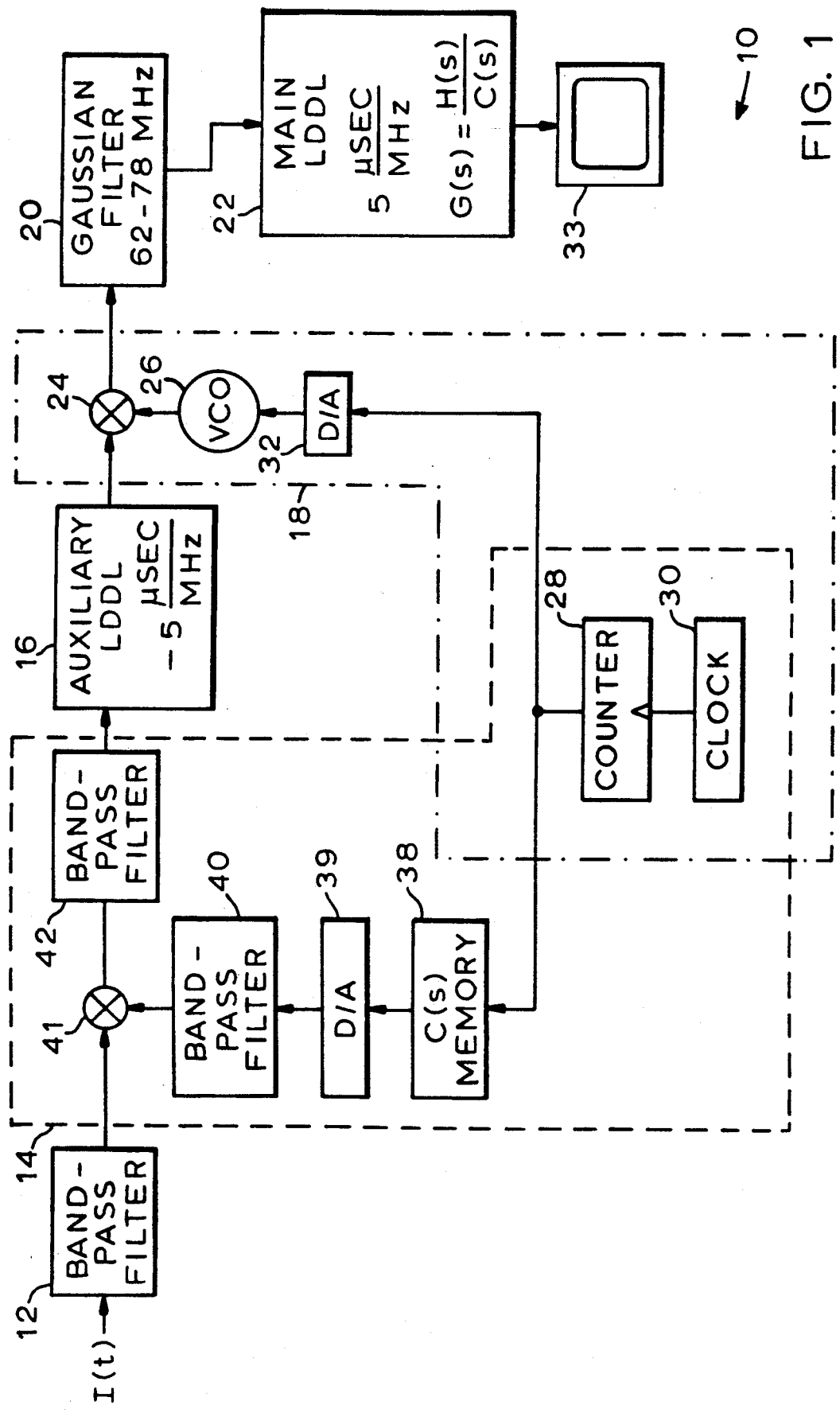
FIG. 1 is a block diagram of a compressive receiver that employs the teachings of the present invention.

FIG. 1 depicts a compressive receiver 10 that employs the teachings of the present invention. An input signal I(t) is applied to a conventional bandpass filter 12 employed in the conventional manner to prevent aliasing. A modulation circuit 14 and an auxiliary linear dispersive delay line 16 operate on the resultant filtered signal in a manner that will be described in more detail below, and the delay line 16 applies the result to a conventional compressive receiver. The compressive receiver includes a frequency translator 18, a Gaussian bandpass filter 20, and a main dispersive delay line 22, which together operate in the conventional manner.

Specifically, the chirp frequency translator 18 repetitively translates the output of the auxiliary dispersive delay line 16 through a range of frequency differences. The chirp translator conventionally includes a mixer (analog multiplier) 24, which receives as one input the output of the auxiliary dispersive delay line 16. This input signal may, for example, have a frequency range of 65 MHz to 85 MHz.

A voltage-controlled oscillator (VCO) 26 supplies the other input to the multiplier 24. This input is an oscillatory signal whose instantaneous frequency repeatedly sweeps through a range of, say, 127 MHz to 163 MHz. It may be convenient in embodiments of the present invention to provide this sweep by means of a counter 28, which is clocked by a free-running oscillator 30 and resets itself when it reaches a predetermined count. The counter 28 applies its output to a digital-to-analog converter 32, which applies the resultant analog output to the voltage-controlled oscillator 26. As the counter repeatedly counts through this range, the analog output of the digital-to-analog converter 32 is a sawtooth signal, which causes the voltage-controlled oscillator 26 to sweep linearly at a predetermined chirp rate through the 127–163-MHz range.

As those skilled in the art will recognize, the output of the multiplier 24 contains components whose frequencies are the sums of and differences between the VCO and delay-line frequencies. When the voltage-controlled oscillator 26 begins its sweep at 127 MHz, the resultant difference-frequency range in the output of the analog multiplier 24 is 42–62 MHz, while the resultant sum-frequency range is 192–212 MHz. However, the range of the Gaussian filter 20 is only 62–78 MHz, so the Gaussian filter 20 completely filters out the sum frequencies, and it initially passes only the top end of the difference frequencies.

As the frequency of the VCO output increases, the upper end of the difference-frequency range moves into and through the Gaussian-filter range, which the difference-frequency range thereby spans completely until the lower end of the difference-frequency range enters the Gaussian-filter range. The VCO frequency continues to increase until the lower end of the difference-frequency range reaches the upper end of the Gaussian-filter range, at which point the frequency of the VCO output is 163 MHz, the upper end of its range.

The result of this conventional mode of operation can best be appreciated by following the signals that result from a narrow-band component of I(t). Consider a narrow-band component that results in a frequency of 65 MHz in the input of the multiplier 24. Although this frequency is at the lower end of the frequency range of the auxiliary-delay-line output, the resultant difference-frequency component in the output of the multiplier 24 is at the upper end of the difference-frequency range. At the beginning of the VCO sweep, the frequency of this component is 62 MHz, i.e., at the lower end of the Gaussian-filter range.

The output of the voltage-controlled oscillator 26 increases in frequency at a chirp rate of, say, 0.2 MHz/$\mu$sec., so the translation of the narrow-band component increases at the same rate, sweeping through the 16-MHz band of the Gaussian filter 20 in 80 $\mu$sec. The resultant output of the Gaussian filter 20, which is a chirp signal with a Gaussian envelope 80 $\mu$sec. wide, is launched into the surface-acoustic-wave (SAW) dispersive delay line 22.

The design dispersion rate of the dispersive delay line, namely, 5 $\mu$sec./MHz, is the reciprocal of the chirp rate of the frequency translator 18. The dispersion rate is positive, so the part of the pulse at the beginning, when the instantaneous frequency is lower, travels more slowly through the dispersive delay line 20 than the end of the pulse does. The pulse therefore bunches up to the extent that, by the time it gets to the end of the delay line, its duration has been reduced to about 0.16 $\mu$sec.

The same thing occurs with other frequency components, but they are swept through the Gaussian-filter range at a later point in the cycle, so the compressed pulses that they produce at the output of the dispersive delay line 22 occur later. For instance, an 85-MHz frequency component will not be translated into the range of the Gaussian filter 20 until 100 $\mu$sec. after the 65-MHz component is, so pulses that result from the 65-MHz and 85-MHz input components will be 100 $\mu$sec. apart in time. In this way, the time at which a pulse occurs in the output of the main dispersive delay line 22 is an indication of the frequency of the input-signal component that caused it.

The resultant Fourier-transform signal can then be used in any appropriate manner, such as to drive a display 32.

The foregoing discussion was based on the tacit assumption that the dispersive delay line 22 is precisely linear. As was stated above, however, the departures of dispersive delay line 22 from precise linearity will cause sidelobes to accompany the output pulses, and this will detract from the compressive receiver's dynamic range. Without the compensation mechanism to be described below, the departures from linearity experienced with the best currently available surface-acoustic-wave dispersive delay lines are such as to limit the dynamic ranges of their compressive receivers to values not greatly in excess of 30 db. In accordance with the present invention, however, the modulator 14 and auxiliary dispersive delay line 16 compensate to a great extent for the nonlinearity of the main dispersive delay line 22 so that the dynamic range of the compressive receiver can be greatly extended.

We now turn to the manner in which the compressive receiver of the present invention achieves this compensation. Assume that the transfer function of an ideal linear dispersive delay line with a given attenuation and the design dispersion rate of 5 $\mu$sec./MHz is H(s). Assume further that the actual transfer function G(s) of the main dispersive delay line 22 is related to H(s) by a compensation function C(s) such that H(s)=C(s)G(s). It is possible, of course, to determine C(s) experimentally. To compensate for the inaccuracies in the delay line, then, one could in principle simply place the delay line in series with a filter whose transfer function is C(s). But it would be nearly as difficult to synthesize such a filter as it is to improve the performance of the delay line itself. To avoid this problem, the present invention does not compensate in the frequency domain, as a filter would. Instead, it applies C(s) in the time domain.

To understand how this is possible, suppose that I(t) consists only of a single frequency component. The resultant signal at the input port of the main delay line would sweep through a range of frequencies, and its instantaneous frequency would increase at the chirp rate. Suppose further that a hypothetical modulation circuit at the delay-line input port modulates the delay-line input in amplitude and frequency by a time function consisting of C(s) evaluated at $s=j2\pi f$, where f increases at the chirp rate so as always to equal the instantaneous frequency of the delay-line input component. Under these assumptions, C(s) is applied in the time domain, and the resultant transfer function for the combination of the hypothetical modulation and the delay-line delay is H(s), i.e., that of an ideal linear dispersive delay line.

Of course, I(t) typically includes many frequency components, and the proposed time-domain modulation at the input port of the main dispersive delay line 22 could provide the proper compensation for only one of them.

I have recognized, however, that it is possible to provide the desired compensation for all input-signal frequency components by modulating the compressive-receiver input by C(s) and then dispersively delaying the resultant modulated signal at a dispersion rate equal to the reciprocal of the chirp rate. This can be understood by considering the operation of the compressive receiver 10 on an input signal I(t) consisting only of two narrow-band components, one at 125 MHz and another at 145 MHz. For the sake of example, these frequencies will be taken as the limits of the compressive receiver's input frequency range as well as of that of the bandpass filter 12.

The purpose of the modulation circuit 14 is to modulate I(t) with values of C(s). In the illustrated embodiment, it also translates I(t) downward in frequency by 60 MHz, although such a frequency translation is not a necessary element of the present invention.

The modulation circuit 14 shares the counter 28 and the clock 30 with the chirp frequency translator 18. It includes a memory 38, whose address input is the counter output. A digital-to-analog converter 39 converts the memory output to analog form and applies the result to a bandpass filter 40. Together these elements act as a modulation-signal source whose output is applied to a modulator that includes an analog multiplier 41 and a bandpass filter 42.

The contents of the memory 38 are such that the output of bandpass filter 40 represents C(s) evaluated at the chirp rate of the frequency translator 18. Specifically, the memory contents are the real parts of a(t-)exp[jb(t)+(j2$\pi$60 MHz)t], where the exponential expression represents an arbitrarily chosen 60-MHz carrier and a(t) and b(t) are the magnitude and phase of C(s) evaluated at frequencies that begin at 62 MHz and increase at the chirp rate, namely, 0.2 MHz/$\mu$sec., up to 78 MHz. That is, a(t) and b(t) are the magnitude and phase of C(s) evaluated at $s=j2\pi[62$ MHz$+(0.2$ MHz/$\mu$sec.)t]t. Although I have chosen to provide the modulation signal as a modulated carrier, those skilled in the art will recognize that, with a different type of modulator 14, the modulation signal could take the form of two baseband signals without the 60 MHz carrier.

Bandpass filter 40 has a center frequency of 60 MHz, the frequency of the carrier. It receives a jagged signal representing discrete values of the real part of a(t-)exp[jb(t)+(j2$\pi$60 MHz)t] and smooths it into a modulation signal that takes the form of a phase- and amplitude-modulated sinusoid. For proper compensation, the bandwidth of the modulation signal is on the order of twice the frequency difference represented by the time interval between a center lobe in the uncompensated receiver output and the furthest unacceptable sidelobe that accompanies it.

Figure 2A:
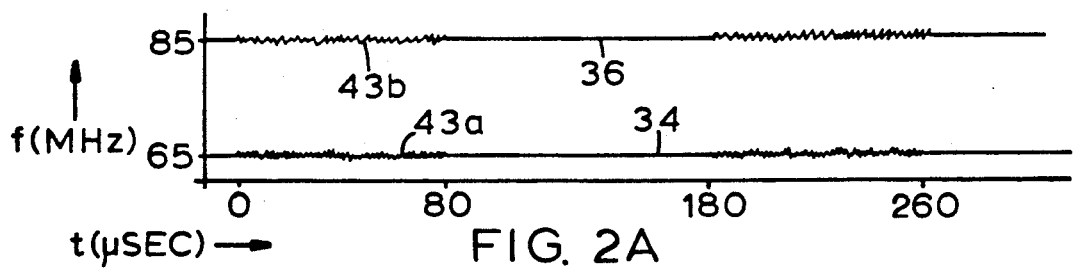
FIG. 2A is a plot of the frequencies of two components of the output of a modulation circuit employed in the compressive receiver.

The compressive receiver operates in 180-$\mu$sec. cycles although, as was observed above, only 80 $\mu$sec. of any single-frequency component of I(t) affects the compressive-receiver output in any cycle. FIG. 2A depicts two cycles of the output of bandpass filter 42 on a frequency-versus-time plot. It shows that this signal consists of two frequency components, one at 65 MHz, represented by line 34 in FIG. 2A, and the other at 85 MHz, represented by line 36 in FIG. 2A.

At time $t=0$, the modulation circuit 14 begins to modulate the incoming single with C(s) evaluated at $s=j2\pi f$, where f equals 62 MHz at $t=0$ and increases with time until, at $t=80$ $\mu$sec., it reaches 78 MHz and has thus traversed the pass band of the Gaussian filter 20. Note that 80 $\mu$sec. is the width of the pulse that a single-frequency continuous-wave signal component in I(t) causes in the output of the Gaussian filter 20. The result is that coterminous segments 43a and 43b of the narrow-band components 34 and 36, respectively, are modulated by successive values of C(s) between C(j2$\pi$62 MHz) and C(j2$\pi$78 MHz).

The resultant modulated signals are launched into the auxiliary dispersive delay line 16, whose dispersion rate is equal in magnitude but opposite in sign to that of the main delay line 22. As will become apparent as the description proceeds, the opposite sign is necessary because the frequency translator 18 operates in the difference mode in the illustrated embodiment. If it operated in the sum mode, the signs of the dispersion rates would be the same.

Figure 2B:
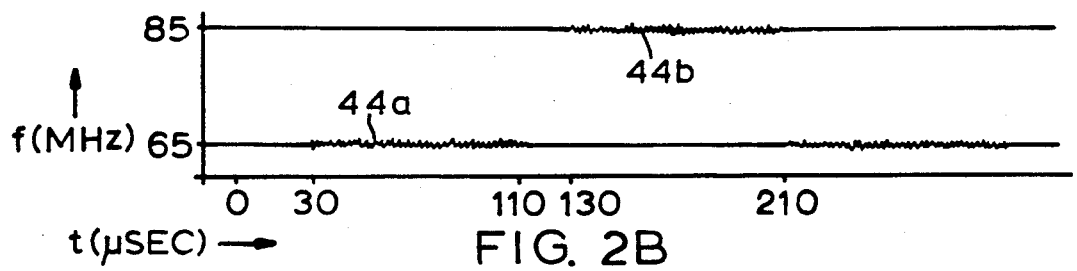
FIG. 2B is a similar plot of the output of an auxiliary delay line employed in the compressive receiver.

Because of dispersion, the two segments 43a and 43b depicted in FIG. 2A result in outputs from the auxiliary delay line 16 represented by line segments 44a and 44b of FIG. 2B. As that drawing shows, the 65-MHz component is delayed by 30 $\mu$sec., while the 85-MHz component is delayed by 130 $\mu$sec. The dispersion also slightly lengthens the durations of the modulated segments, although the drawings do not depict this effect.

Figure 2C:
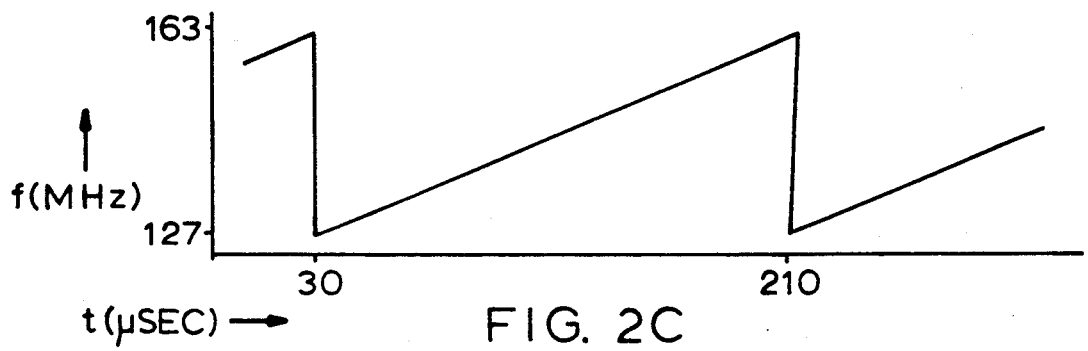
FIG. 2C is a similar plot of the output of a chirp oscillator employed in the compressive receiver.

FIG. 2C depicts the frequency-versus-time behavior of the VCO output. In particular, it shows that a period of the VCO output's sawtooth in frequency begins at $t=30$ $\mu$sec., at which time it has a value of 127 MHz, and continues increasing until $t=210$ $\mu$sec., at which time it reaches a value of 163 MHz and returns to the 127-MHz value.

Of course, those skilled in the art will recognize that the frequency change depicted as being instantaneous at $t=210$ $\mu$sec. would actually take some time, and a practical system would leave some time for the voltage-controlled oscillator 26 to settle. Additionally, it would be necessary in practice to extend the sweep beyond the 127-210-MHz range in order to accommodate the frequency "smearing" that the modulation causes. For the sake of simplicity, however, the drawings do not reflect these factors.

Figure 2D:
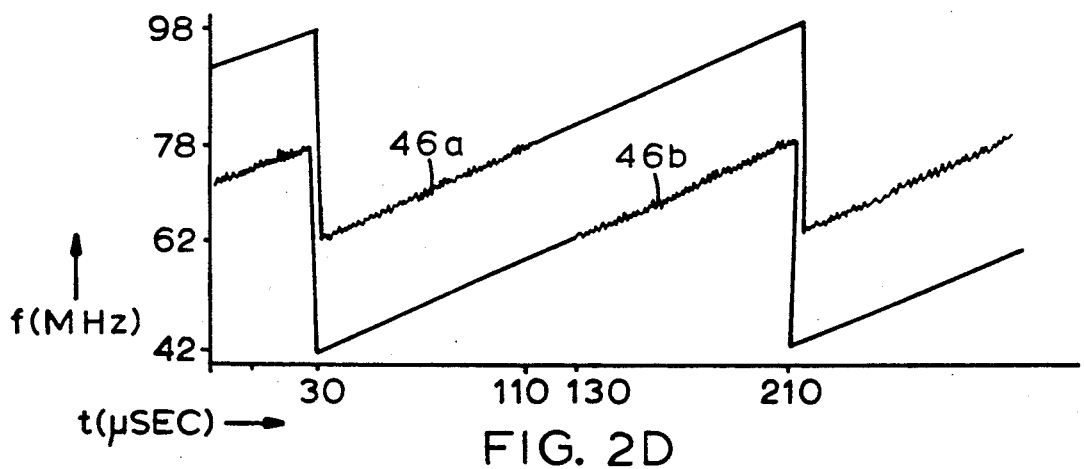
FIG. 2D is a similar plot of the output of a multiplier employed in the compressive receiver.

As was stated before, the multiplier 24 generates sum and difference frequencies, and the Gaussian filter 20 passes only the difference frequencies. FIG. 2D depicts the difference frequencies that result from multiplying the VCO signal depicted in FIG. 2C by the modulated segments of the two narrow-band components depicted in FIG. 2B. Specifically, the lower-frequency component, represented by line segment 44a in FIG. 2B, is progressively translated from values that start at 62 MHz at t=30 μsec. and proceed through 78 MHz at t=110 μsec., as line segment 46a illustrates. Note that these are precisely the frequency values for which that segment was modulated by C(s). For this component, therefore, the effective transfer function in the main delay line 22 is G(s)C(s)=H(s), the desired linear-delay transfer function.

The component of the multiplier output that results from the 85-MHz component of I(t) begins at t=30 μsec. with an instantaneous frequency of 42 MHz. Because the 85-MHz component is delayed differently in the auxiliary delay line 16, the multiplier output component resulting from the 85-MHz I(t) component does not bear the C(j2π62 MHz) modulation at t−30 μsec., as that resulting from the 65-MHz I(t) component does. Instead, that component bears the modulation by C(j2π62 MHz) at t=130 μsec., i.e., at the time at which it has been translated to 62 MHz. Thus, the result of this frequency component, represented in FIG. 2D by line segment 46b, is like that of the other frequency component in that it, too, bears the modulation corresponding to its instantaneous frequency at the input port of the main dispersive delay line 22 and thus also contains the compensation for the departure of the main delay line 22 from linearity.

Figure 2E:
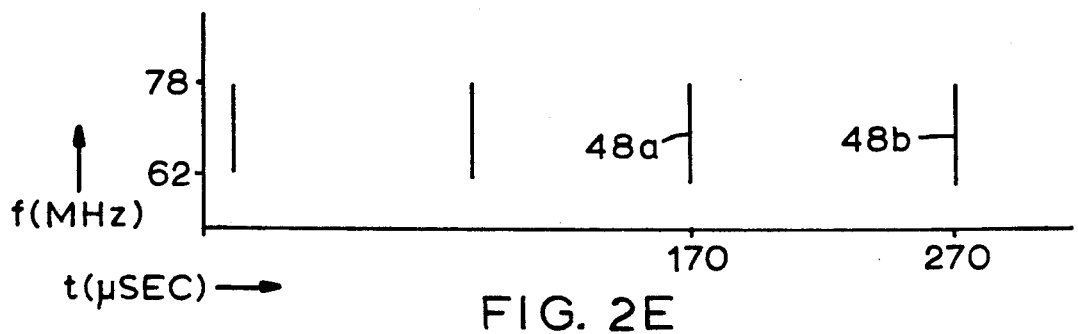
FIG. 2E is a similar plot of the output of the main delay line employed in the compressive receiver.

It is therefore apparent that any other components of I(t) bear modulation that compensates for the difference between the actual main-delay-line transfer function G(s) and the intended transfer function H(s). The thus-compensated signals propagate through the main delay line 22 in the conventional manner, bunching into short-duration pulses 48a and 48b, as FIG. 2E illustrates, and the compensation that they carry reduces sidelobe magnitude and thus increases the dynamic range of the receiver.

Typically, of course, it is no easier to provide linearity in the auxiliary dispersive delay line than in the main dispersive delay line, and no compensation has been provided for the auxiliary delay line. However, it turns out that the result of the arrangement just described is roughly, to add the dynamic ranges that the delay lines would afford if each were used individually in a separate conventional compressive receiver. For example, if the linearity of each delay line is only good enough to result in a dynamic range of 30 db in a conventional compressive receiver, the result of their use in the present invention is approximately a dynamic range of 30 db+30 db=60 db.

The compressive receiver of the present invention therefore enables the designer to obtain dynamic ranges previously unavailable in compressive receivers, and it is particularly beneficial for those that are implemented with SAW delay lines. The present invention accordingly represents a significant advance in the art.

I claim:
1. A compressive receiver comprising:
    A) a modulator for receiving an input signal and a modulation signal and generating a modulated output signal by modulating the input signal in accordance with the modulation signal;
    B) a modulation-signal source for applying to the modulator a modulation signal representing a compensation function at a chirp rate, the compensation function approximating the ratio of (i) the transfer function of an ideal linear dispersive delay line characterized by the chirp rate to (ii) a main transfer function;
    C) an auxiliary dispersive delay line, connected to receive the modulator output, for dispersively delaying the modulator output with a delay that is approximately proportional to frequency in accordance with the chirp rate and thereby producing an auxiliary-delay-line output signal;
    D) a frequency translator for repeatedly translating the auxiliary-delay-line output signal at the chirp rate and thereby producing a translated signal; and
    E) a main dispersive delay line for applying the main transfer function to the translated output signal and thereby producing an output that approximates a Fourier transform of the input signal.

2. A compressive receiver as defined in claim 1 wherein the main dispersive delay line is a surface-acoustic-wave delay line.

3. A compressive receiver as defined in claim 2 wherein the auxiliary dispersive delay line is a surface-acoustic-wave delay line.

4. For performing a Fourier transformation of an analogue input signal, a method comprising the steps of:
    A) modulating the input signal in accordance with a compensation function evaluated at a chirp rate, thereby generating a modulated output signal, the compensation function approximating the ratio of (1) the transfer function of an ideal linear dispersive delay line characterized by the chirp rate to (2) a main transfer function;
    B) dispersively delaying the modulator output with the delay that is approximately proportional to frequency in accordance with the chirp rate;
    C) translating the dispersively delayed modulator output in frequency at the chirp rate and thereby producing a translated output signal; and
    D) dispersively delaying the translated output signal in accordance with the main transfer function to produce a Fourier-transform output signal.

5. A method as defined in claim 4 wherein the step of dispersively delaying the translated output signal comprises applying the translated output signal to a surface-acoustic-wave delay line whose transfer function is the main transfer function.

6. A method as defined in claim 5 wherein the step of dispersively delaying the modulated output signal comprises applying the modulated output signal to a surface-acoustic-wave delay line whose delay is approximately proportional to frequency in accordance with the chirp rate.

* * * * *